United States Patent Office 3,572,166
Patented Mar. 23, 1971

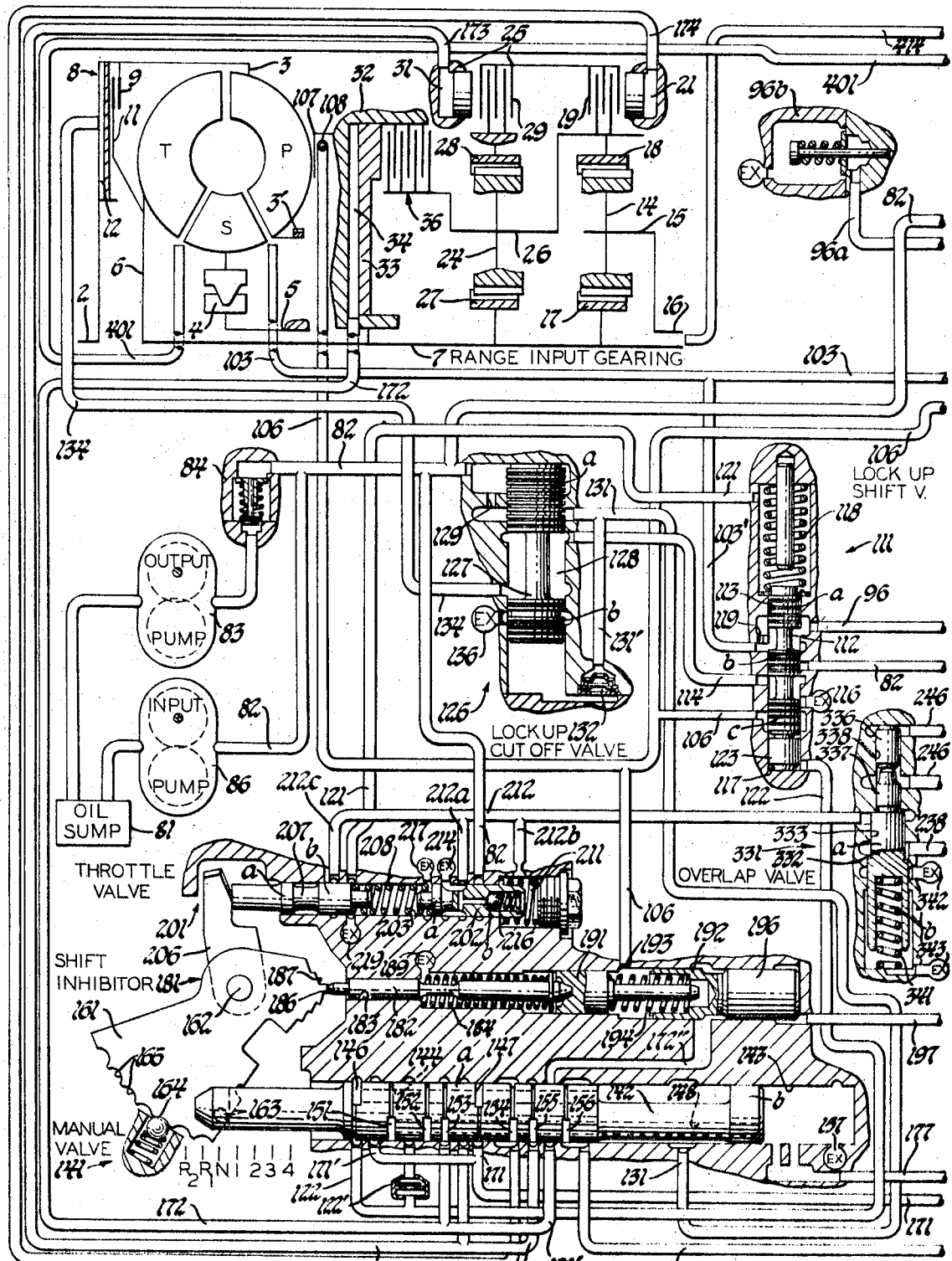

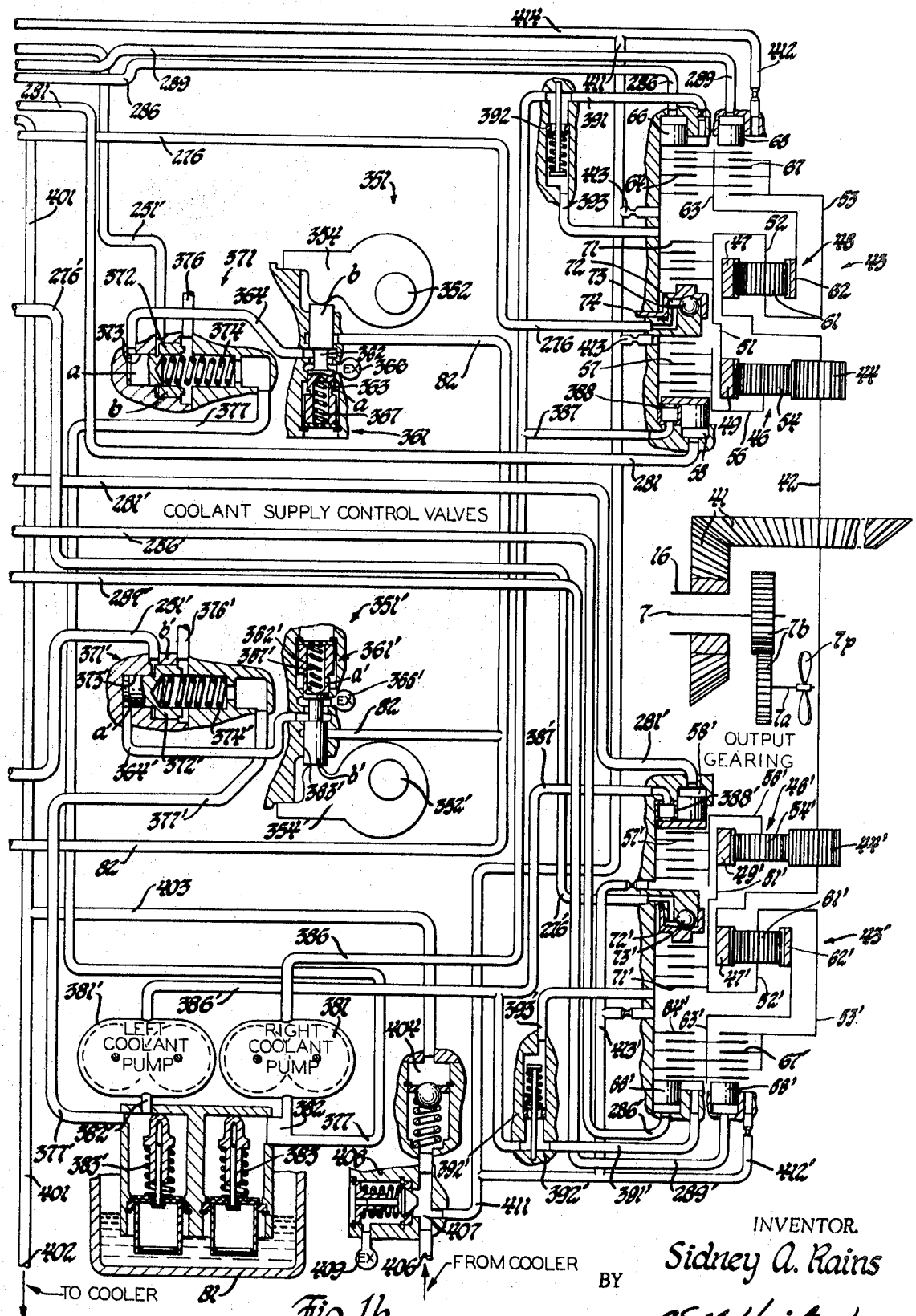

3,572,166
DUAL OUTPUT TRANSMISSION
Sidney A. Rains, Speedway, Ind., assignor to General
Motors Corporation, Detroit, Mich.
Filed May 14, 1969, Ser. No. 824,398
Int. Cl. F16h 37/06
U.S. Cl. 74—720.5
28 Claims

ABSTRACT OF THE DISCLOSURE

The dual output transmission shown has a range unit having a torque converter, lockup clutch and range multi-ratio gear unit and an output unit having two output multi-ratio gear units for driving two steer and vehicle brakes for retarding a dual output shaft either equally or selectively for driving and drive steering a tracked vehicle. The drive controls provide manual selection of drive ratios in the range and output gear units to provide a plurality of overall drive ratios. The steer control controls the output unit to provide drive brake steering, geared steering and pivot steering. The steer type control, i.e. land or water overcontrols the drive and steer controls to provide two overall drive ratio programs and two steering programs having different types of steering, one having geared steering and drive brake steering and the other having geared steering and pivot steering. The steer type control also over-controls the downshift inhibitor of the drive controls to reduce the speed at which downshifts are inhibited when the steer program includes pivot steering. The drive controls provide a positive neutral and engage the lockup clutch for a positive power take off drive in neutral.

Figure 1A:
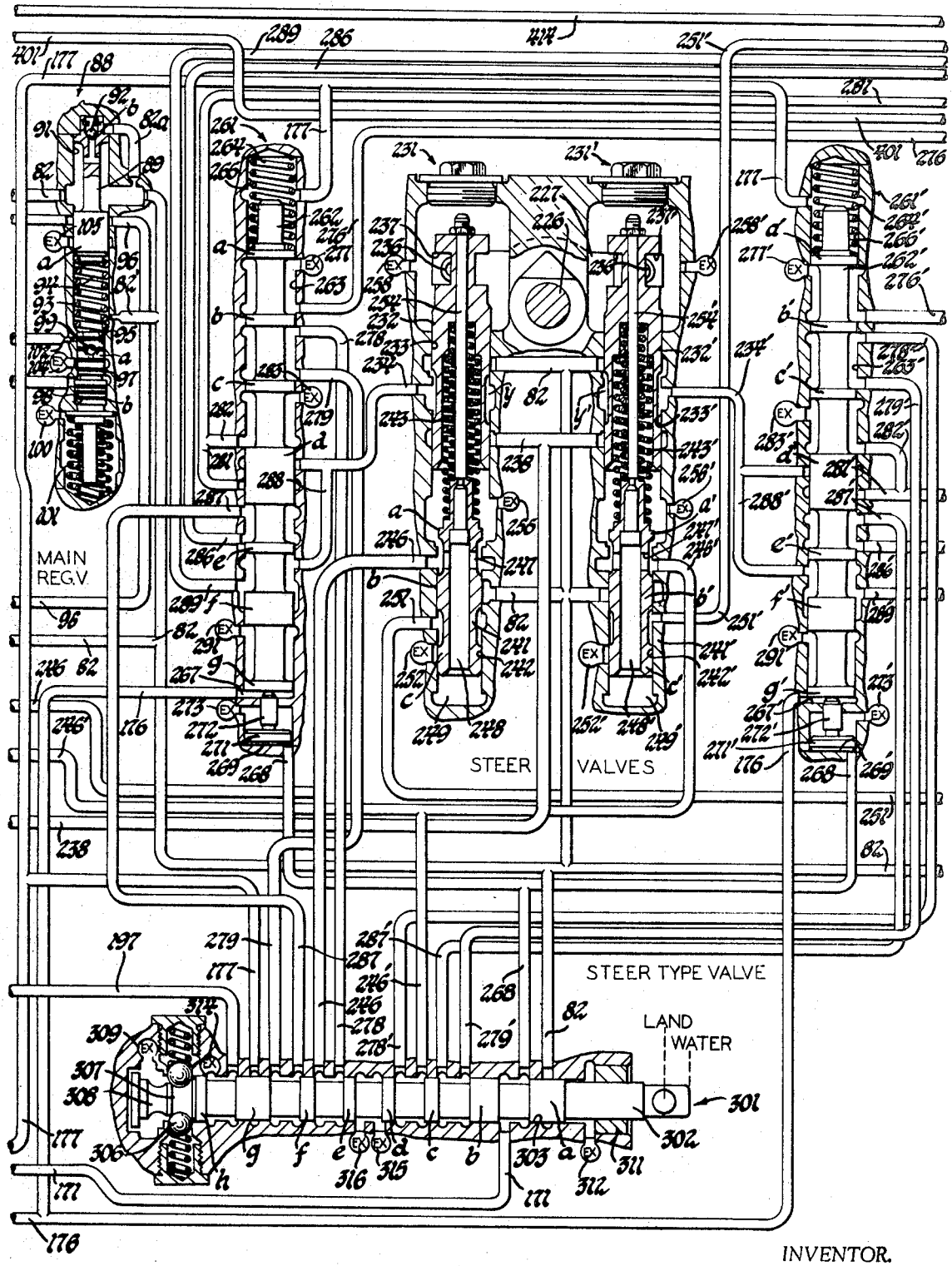

This invention relates to transmissions and particularly dual output steer drive transmissions and controls therefor.

This invention relates to a dual output transmission of the type used for tracked vehicles and other vehicles which drive straight by equally driving the dual outputs and steer by unequally driving and retarding the dual outputs. This transmission range unit has a torque converter, lockup clutch and range multiratio unit to provide the basic ratio range for straight drive operation. The output unit has an output multiratio gear unit for driving and a steer and vehicle brake for driving and braking each of the dual output shafts. The drive controls provide for manual selection of a ratio in the range unit and the same ratio in each output unit to provide the proper overall series of ratios, one group for land operation and another group for water operation, depending on whether the steer type control is set for land or water operation. The steer controls selectively provide the proper type steering in each range ratio and for land operation provide in response to the steering control geared steering in the higher speed ratios and drive brake steering in the lower speed ratios and for water operation provide geared steering in the higher speed ratios and pivot steering in the lower speed ratios.

The manual control for selecting the overall ratios is inhibited to prevent a downshift which would overspeed the engine. The manual shift lever has a sequentially stepped cam with each higher ratio having a step at a smaller radius cooperating with a cam stop positioned by governor pressure moving the cam stop to higher positions with increasing speed.

The high range ratio pressure acts with the governor pressures in high ratio (fourth) to reduce the speed at which a downshift from high (fourth) to intermediate (third) is inhibited as compared to a downshift from intermediate (third) to low (second) because the four three ratio step is larger than the three two ratio step so the downshift inhibiting cam can have sequentially reduced radius steps with increasing ratio.

The steer type control provides a similar large reduction in high for a fourth to third shift and a smaller reduction in intermediate (third) to reduce shift shock in intermediate when pivot steer is used.

An object of this invention is to provide in a dual output transmission having driving controls providing a plurality of ratios, steering controls selectively providing different types of steering such as drive brake steer, geared steer and pivot steer operatively controlled by a steer type control to provide one program having different types of steering in the ratios and another program having different types of steering in certain of the ratios.

Another object of this invention is to provide in a dual output transmission having driving controls having a plurality of ratios, steering controls selectively providing different types of steering, such as drive brake steer, geared steer and pivot steer, operatively controlled by a steer type control to provide one program having two of the three types of steering in the ratios and another program having another two of the three types of steering.

Another object of this invention is to provide in a dual output transmission having driving controls having a plurality of ratios, steering controls selectively providing different types of steering such as drive brake steer, geared steer and pivot steer, operatively controlled by a steer type control to provide one program having geared steer in the higher ratios and drive brake steer in the lower ratios and another program having geared steer in a smaller group of higher ratios and pivot steer in the remaining lower ratios.

Another object of the invention is to provide in a steering transmission an improved ratio downshift inhibitor controlled by the steering control to lower the downshift speed in certain phases of steer control.

Another object of the invention is to provide in a steering transmission an improved ratio downshift inhibitor controlled by a steer type control.

Another object of the invention is to provide in a steering transmission having a plurality of drive ratios a ratio downshift inhibitor which inhibits a downshift at a lower speed when the steering controls provide pivot steering than when the steering controls provide steering by either drive brake steering or geared steering.

Another object of this invention is to provide in a dual output transmission having driving controls having a plurality of ratios, steering controls selectively providing different types of steering such as drive brake steer, geared steer and pivot steer, operatively controlled by a steer type control to provide one program having geared steer in the higher ratios and drive brake steer in the lower ratios and another program having geared steer in a smaller group of higher ratios and pivot steer in the remaining lower ratios and a ratio downshift inhibitor operative at a lower speed when the steer controls provide pivot steering.

These and other objects and modifications of the invention will be apparent from the following description and drawing illustrating the invention.

FIG. 1 schematically shows range gearing and controls.

FIG. 1a schematically shows steering controls.

FIG. 1b schematically shows output gearing and controls.

FIG. 2 shows how to arrange FIGS. 1, 1a and 1b to provide the complete gearing and control schematic of this dual output drive and steering transmission.

The cross drive transmission has a range unit 1, FIG. 1, and an output unit, FIG. 1b. In the range unit 1 the input shaft 2 drives the tongue converter housing 3, which drives the torque converter pump P to circulate fluid through the turbine T and the stator S which is held by the one-way brake 4 attached to the grounded sleeve 5. The turbine is connected by a hub 6 to drive an intermediate shaft 7. The input shaft 2 is also connected to drive the intermediate shaft 7 by a lockup clutch 8 having a backing plate 9 fixed to the converter housing 3, a driven plate 11 connected to drive the hub 6 and a fluid motor 12 having a conventional piston located in the cylinder and operable on the supply of fluid to the cylinder to move the piston to engage the lockup clutch. Conventional retraction springs, not shown, or the pressure of the operating fluid in the torque converter housing may return the piston for clutch disengagement. The low planetary gear set has planetary pinions 14 mounted on a carrier 15 which is connected to drive the range output shaft 16. The pinions mesh with sun gear 17 driven by intermediate shaft 7 and ring gear 18 which may be retarded by the low brake 19 when engaged by the fluid motor 21 to establish low ratio drive in the range unit. The intermediate gear set has planetary pinions 24 mounted on a carrier 26 which is connected to drive the ring gear 18. The pinions 24 mesh with sun gear 27 driven by shaft 7 and ring gear 28 which may be retarded by the intermediate brake 29 when engaged by the intermediate motor 31 to establish intermediate range ratio drive. The low and intermediate motors 21 and 31 are conventional motors having a piston mounted in a cylinder on the fixed housing 25. The motors are selectively actuated on the supply of fluid thereto to engage the respective brake. Each brake has alternate plates splined to the housing and intermediate plates splined to the associated ring gear. Retraction springs (not shown) release the brakes. The intermediate shaft 7 is also connected to drive the hub 32. The motor has a piston 33 in the cylinder 34. On the supply of fluid, the piston is moved to engage the high clutch 36 which connects the hub 32 driven by shaft 7 to the carrier 26 to lock up the range gearing for forward one to one drive or high ratio. The clutch is of the plate type with alternate plates splined to hub 32 and intermediate plates splined to a part of carrier 26.

In the output unit 2, the range unit output shaft 16 is connected by the bevel gear set 41 to drive the cross shaft 42 which respectively drives the right output unit 43 and the left output unit 43'. These units are the same and thus the following description of the right unit 43 also applies to the left unit with the same numbers primed. The cross shaft 42 drives sun gear 44 of the reversing gear set 46 and the ring gear 47 of the reduction gear set 48. The reversing gear set 46 has a ring gear 49 connected via drum 51 and carrier 52 of the reduction gear set to the right output shaft 53 which drives a suitable traction device such as track sprockets. The ring gear 49 and input driven sun gear 44 mesh with planetary pinions 54 which are mounted on carrier 56 which are retarded by the reverse brake 57 when actuated by the fluid motor 58 to hold the ring gear and provide reverse drive. The reduction gear set 48 has a plurality of pinions 61 mounted on the output carrier 52 which mesh with the input driven ring gear 47 and the controlled sun gear 62 which is connected to the hub 63. The sun gear 62 is held for low ratio when the low or geared steer brake 64 is applied by the low motor 66. When the high or output clutch 67 is engaged by the high motor 68, the drum 63 and the sun gear 62 rotate at the same speed as shaft 53 to provide 1:1 drive ratio in the output unit for the high ratio output drive. The vehicle brake 71 is located between the housing and drum 51 to brake the output shaft 53 when applied by motor 72.

The low and high ratio motors 66 and 68 and the reverse motor 58 are conventional motors having a piston located in a cylinder on the fixed housing with conventional retraction springs and apply the friction devices on the supply of fluid to the motor. The brake motor 72 has an internal fixed cylinder and external movable piston with conventional retraction springs and on the supply of fluid, applies the brake. The ball and ramp cam mechanism 73 is also located between the piston and cylinder so that when the annular piston is rotated by means of the lever 74, the brake is mechanically applied. The piston contacts a rotary plate so the balls provide self energization during mechanical and hydraulic brake application.

HYDRAULIC CONTROL SYSTEM

The lubrication, cooling and exhaust fluid from the system preferably returns to a single sump 81, FIGS. 1 and 1b, and is supplied to the mainline 82 by an output driven pump 83 through a one-way check valve 84 and by an input driven pump 86 connected directly to the branch of the mainline 82. The output pump may be driven by cross shaft 42 and the input pump may be driven by gear 3' on converter housing 3. The piloted mainline pressure regulator valve 88, FIG. 1a, has a regulating valve element 89 having lands $a$ and $b$ of equal diameter located in the bore 91. The mainline 82 is connected continuously through the bore 91 between the lands $a$ and $b$ and connected by the one-way check valve passage 92 for one-way flow and by the restricted passage 82a for two-way restricted flow to the closed end of the bore 91 to act on the free end of the land $b$ to provide the regulated fluid pressure bias on valve element 89 against bias of the light valve spring 93 seated on the valve body and the pilot pressure in the chamber 94 acting on the free end of land $a$. When mainline pressure is at the regulated value, the first overage is connected to the converter feed line 96 and the second overage to the exhaust 105. The converter feed line 96 is connected by branch 96a to converter pressure relief valve 96b which limits converter feed pressure. The mainline is connected by restricted branch 82' to the pilot chamber 94 and the pilot chamber pressure is regulated by the pilot regulator valve 97 having a small land $a$ in bore 95 and a large land $b$ in bore 98. The pilot pressure chamber 94 communicates through a central axial passage and radial port 99 in valve element 97. On movement of the valve 97 by the pilot pressure in chamber 94 against the dual biasing springs 101 in the end of the bore vented by exhaust 100, the pilot pressure is first exhausted through restriction 102 to the converter supply line 103 to use the continuous pilot valve exhaust and additional overage is connected through exhaust 104 which is free and cannot be restricted. The pitot governor line 106 is connected to the step between the small bore 95 and the large bore 98 to act on the differential area of land $b$ to provide a speed responsive bias opposing the spring and thus reducing the regulated pilot and mainline pressures with increasing speed.

The pitot governor, FIG. 1, has an annular can 107 fixed to the housing 32 rotating with shaft 7. Oil is fed from a suitable restricted feed from one of the lubrication lines or main line to keep the can filled and the pitot 108 has an open end to receive the oil rotating with can 107 to provide a pressure in the pitot line 106 which varies with the speed of shaft 7.

The lockup shift valve 111 (FIG. 1) has a valve element 112 having lands $a$, $b$ and $c$ located in the bore 113. Valve element 112 is shown in the downshift position where main line 82 is blocked by land $b$, the lockup feed line 114 is connected to exhaust 116 and the converter feed line 96 is connected to a branch 103' of the converter supply line 103. Governor pressure line 106 is connected to the lower end of bore 113 between land $c$ and plug 123 and at a suitable vehicle speed upshifts the valve against the biasing spring 118 to the upshift position, where main line 82 is connected to the lockup feed line 114 and the converter feed line 96 is connected only through restriction 119 to the converter supply line 103'. Land $c$ is smaller than the other lands to provide hysteresis on this shift to lockup position. When manual downshift pressure is supplied by line 121 from the throttle valve described below to the closed end of the spring chamber portion of the bore, the valve is positioned in the downshift or converter drive position. In the neutral position of the manual selector valve described below, indicated by E' in the following table. The neutral signal line is also connected to the bore by a one-way valve passage 122' which only permits exhaust flow E' from the neutral signal line to the valve bore but does not permit supply flow.

| Manual selector valve 141 | N sig. 122-122' | N 1st sig. 171-171' | High clutch line 172-172' | Int. brake line 173-173' | Low brake line 174 | Rev. sig. line 176 | 3-4 sig. line 177 |
|---|---|---|---|---|---|---|---|
| 4 | E & E' | E | F' | E | E | E | F |
| 3 | E | E & E' | E | F' | E | E | F |
| 2 | E | E & E' | E' | E | F | E | E |
| 1 | E | F' | E & E' | E & E' | F | E | E |
| N | F | F | E | E' | E | E | E |
| R$_1$ | E' | E' | E' | F | E | F | E |
| R$_2$ | E | E | F | E' | E | F | E | the neutral signal line 122 pressurizes chamber 117 to act on plug 123 to hold the lockup valve in the lockup position when the transmission is in neutral to prevent torque multiplication by the torque converter when driving power take-off devices, such as a propeller 7p (FIG. 1b) or water jet drive by power take-off drive shaft 7a driven by gears 7b from shaft 7. The neutral signal line is supplied with pressure in neutral and blocked in other ratio positions as pointed out in the description of the manual valve.

The flow valve 126 (FIG. 1) has a valve element 127 having a small land a and a slightly larger land b located in a stepped bore 128. The mainline 82 is connected to the closed end of bore 128 to act on the free end of land a and also connected by restriction 129 to the range line 131. Range line 131 is connected by branch 131' via a conventional restricted feed and fast return check valve 132 to the opposite end of bore 128 to act on the free end of the larger land b. When there is no flow in the range line, main line pressure acting on land a and the range line pressure acting on land b are the same since the range line pressure acts on the larger land b, the valve is held in the connecting position shown connecting the lockup feed line 114 between the lands to the converter feed line 134. When the manual selector valve connects the range line 131 to one of the ratio motors, flow through the orifice 129 reduces the pressure in range line 131 as compared to main line 82 and thus the higher main line pressure acting on land a shifts the valve to the disconnect position blocking lockup feed line 114 and connecting lockup clutch line 134 to exhaust 136 to disengage the lockup clutch whenever there is a range ratio change.

The manual selector valve 141 (FIG. 1) has a valve element 142 having lands a and b located in a bore 143. The space between the lands connects with the supply bore 144 which feeds the ports 146 and 147 in land a. The exhaust bore 148 connects exhaust ports 151, 152, 153, 154, 155 and 156 in land a through the valve to the end of land b where it is connected to exhaust 157. The manually moved cam member 161 is pivotally mounted on a pin 162 fixed to the valve body and connected by a pin 163 to actuate the valve member to move it to reverse second R$_2$, reverse first R$_1$, neutral N, first 1, second 2, third 3, and fourth 4 drive positions. The spring loaded ball detent 164 located in the fixed housing engages a detent recess 166 for each valve position to resiliently hold the valve in each position. The range line 131 is connected to the bore 143 between the lands a and b in all valve positions to feed the supply bore 144 and ports 146 and 147 which selectively feed the neutral signal line 122, the neutral first signal line 171 or its branch 171', the high clutch line 172 or its branch 172', the intermediate reaction brake or clutch line 173 or its branch 173', the low reaction brake or clutch line 174, the reverse signal line 176, and the three-four signal line 177 as indicated by F for feed to the line and F' for feed to the primed branch in the following table. The above exhaust ports and bore 148 provide exhaust from the line as indicated by E and from the primed branch as The shift inhibitor 181 has a plunger 182 mounted in a bore 183 and is biased by spring 184 so that the cam follower and inhibitor end 186 is disengaged from the stepped cam 187 on the cam member 161. It will be noted that the highest cam step is for neutral and that the cam steps have a sequentially reduced radius about pivot pin 162 for R$_1$ and R$_2$ and for 1, 2, 3 and 4 valve positions. The spring chamber is vented by exhaust 189. The governor pressure line 106 is connected to the bore so governor pressure acts on the plunger 191 to move the plunger to the left towards the cams 187 compressing the spring 184 to variably position the height of follower 186 proportional to speed so that at certain speeds downshifts cannot be made in order to prevent injury to the engine by downshifting at excessive speeds where after the downshift the engine would be driven by the load or vehicle at a speed above the maximum safe engine speed. The high clutch branch line 172" is connected to the bore so the pressure supplied in 4th ratio acts on the separate plunger 192 to move the plunger a predetermined distance to shoulder 193 to increase the force of spring 194 acting through plunger 191 which opposes spring 184 to reduce the effective governor pressure required to hold the inhibitor rod 182 at the inhibitor position at all governor pressures and speeds so that a manual 4-3 downshift is only available at a lower speed than would otherwise be available.

This arrangement provides in 4th position of the manual valve 141 high ratio or 4th drive pressure via line 172" to compress spring 194 to assist governor pressure acting on the inhibitor plug 191 in order to place the inhibitor follower 186 in a higher position in relation to the position it would have due only to governor pressure. In this way the 4-3 downshift inhibitor speed is reduced. This makes it possible to use a sequentially stepped cam when the 4-3 ratio step is larger than the 3-2 ratio step and thus the downshift inhibiting speed in 4th must be lower than the downshift inhibiting speed in 3rd. The downshift inhibiting speed is the lowest speed at which the inhibitor inhibits a downshift in a particular ratio. A steer separate control pivot plug 196 similarly actuates plug 192 when actuated by the 3 and 4 pivot signal pressure supplied via line 197 from the steer type control valve 301 in pivot position and manual valve 141 in the 4 and 3 positions, lowers the speed at which the shift inhibitor will permit a 4-3 and 3-2 downshift.

In fourth drive the 3-4 pivot signal pressure does not change the operation of the inhibitor since high pressure holds plug 192 against shoulder 193. Since the steering operation in both land and pivot or water type steering is the same, geared steer, in both 3rd and 4th drives there is no need to lower the inhibiting speed. However, a 3-2 downshift may be accompanied by a change from geared steer to pivot steer in pivot or water type steering and thus the 3-4 pivot signal is used to reduce the 3-2 downshift inhibiting speed to prevent shock on a 3-2 shift particularly where accompanied by a change to pivot steer.

The throttle valve 201 has a regulator valve 202 having lands a and b located in a bore 203. A throttle pedal actuated lever 206 controls the position of the throttle valve 207 having lands *a* and *b* in the bore 203 and the compression of spring 208 acting on the regulator valve. At the zero throttle position shown the return spring 211 holds the regulator valve 202 in the closed position connecting throttle pressure line 212 via branch 212a to exhaust 214 and no throttle pressure is provided. As the throttle lever 206 is rotated clockwise to move throttle valve 207 to the right compressing springs 208 and 211, main line 82 is connected between the lands *a* and *b* and the exhaust 214 is substantially closed or in regulating position to provide throttle pressure increasing with throttle pedal position. The force of spring 208 is opposed by the regulated pressure connected to the closed end of bore 203 to act on land *b* by restricted branch 212b and one-way valve passage 216 in the valve element 202 which provides a damping effect. The exhaust 217 vents the bore between the valve elements 202 and 207. At or near full throttle, the throttle pressure branch 212c is at a high or main line pressure value and is connected between the lands *a* and *b* to the detent line 121 connected to downshift the above described lockup shift valve 111. The restricted exhaust 219 vents the detent line 121 in part throttle valve positions to prevent blocking operation of the lockup shift valve.

The right steering valve 231 and the left steering valve 231' are the same and the following description of the right steering valve applies to the left steering valve with the numbers primed.

The manually actuated steer control shaft 226 is pivoted in the valve body and rotates the steer control lever 227 to raise one valve and depress the other.

The steer drive valve element 232 is reciprocally mounted in bore 233 and is moved by a pin 236 on lever 227 which cooperates with the groove 237 in the valve. When the valve is lifted or in the straight drive position shown, main line 82 is connected by groove y to drive feed line 234. When the valve is depressed for right turn the main line is blocked and the drive feed line 234 is connected by groove y to controlled exhaust line 238. The steer regulator valve 241 has lands *a*, *b* and *c* located in bore 242. In the straight drive position shown, main line 82 is blocked by land *b* and right steer feed line 246 is connected to exhaust 256 and left steer signal line 251 is connected to exhaust 252 so no steer pressures are provided. When the steer drive valve 232 is depressed it slides on headed rod 254 to free the rod and attached regulator valve 241 for free movement and acts on the dual springs 243 to provide a force biasing the regulator valve 241 to close exhaust 256 and connect main line branch 82 between lands *a* and *b* to the right steer feed line 246. This pressure is also connected via port 247 and bore 248 to the closed end 249 of the bore to provide an upward hydraulic bias opposing the spring force acting on the valve to regulate the pressure in the right steer feed line 246 at a value proportional to the degree of depression of valve 232 or turning shaft of shaft 227. The left steer signal line 251 remains connected to exhaust 252. Depression of the right valve 232, raises left valve 232' and engages the head of rod 254' to raise the rod. Since the rod 254' is fixed to regulating valve 241' the regulating valve is raised. The left steer feed line 246' remains vented to exhaust 256 and main line 82 is connected to the right steer signal line 251'. Exhaust 258 vents the valve housing.

The right relay valve 261 and the left relay valve 261' are the same and the following description of the right relay valve with the numbers primed applies to the left relay valve. The right relay element 262 has lands *a*, *b*, *c*, *d*, *e*, *f* and *g* and is located in a bore 263 which is closed at both ends. A spring 264 in upper chamber 266 normally biases the valve to the down position shown. The reverse signal pressure line 176 is connected to the closed lower end of the bore to chamber 267 to act on the land *g* to lift the valve to the up position. When the pivot steer signal line 268 supplies pressure to the chamber 269 to lift the piston 271, the stem 272 which extends in sealing relation through an aperture in the end wall of the bore lifts the valve to an intermediate or mid position. The space above piston 271 is vented by exhaust 273. The 3–4 signal line 177 is connected at the upper end of valve 261 to chamber 266 and this pressure and spring will depress the valve to the lower position regardless of whether neutral first signal line 176 or pivot steer signal 268 is pressurized in the third and fourth drive positions.

With the right relay valve element 262 in the down, geared steer, position shown, the following right control connections are made. The right brake apply line 276 is connected between lands *a* and *b* to exhaust 277. The right steer supply line 278 is connected between lands *b* and *c* to the geared steer supply line 279. The right reverse clutch apply line 281 is blocked by land *d* and its branch 282 is connected between the lands *d* and *c* to exhaust 283. The right geared steer or low apply line 286 is connected between lands *d* and *e* to the right geared steer feed line 287. Right drive feed line 234 is blocked at land *d* and connected by branch 288 between the lands *e* and *f* to the output or high clutch apply line 289. The space between lands *a* and *b* is vented by exhaust 277. Space between lands *f* and *g* is connected to exhaust 291. With the relay valve element 262 in the mid position, the right steer supply line 278 is connected between lands *b* and *c* to the right brake apply line 276. The right geared steer supply line 279 is connected between lands *c* and *d* to exhaust 283. The right geared steer feed line 287 is connected between lands *d* and *e* to the right reverse clutch apply line 281. Branch 282 is blocked by land *d*. The right drive feed line 234 is blocked but branch 288 is connected between lands *e* and *f* to the right geared steer or low apply line 286. The right high clutch apply line 289 is connected between lands *f* and *g* to exhaust 291. With the right steer valve in the up position, right steer supply line 278 is connected between lands *b* and *c* to right brake apply line 276. Right geared steer supply line 279 is connected between lands *c* and *d* to exhaust 283. Though branch 288 is blocked, the right drive feed line 234 is connected between the lands *d* and *e* to the right reverse clutch apply line 281 and its branch 282 is blocked. The geared steer feed line 287 is connected between the lands *e* and *f* to right low apply line 286. The right high apply line 289 is connected to exhaust 291. The space between lands *a* and *b* remains vented by exhaust 277.

The steer type control valve 301 provides geared steer and drive brake steer for land operation and geared steer and pivot steer for water or other soft terrain conditions. Valve 301 has a manually operated valve element 302 having lands *a*, *b*, *c*, *d*, *e*, *f*, *g* and *h* located in bore 303. The valve is manually moved between the normal or land position shown, determined by the spring loaded detent 306 engaging groove 307 and the pivot steer or water drive position where the detent engages the groove 308. The detent portion of the housing is vented by exhaust 309. At the other end of the valve, the seal 311 prevents leakage from the valve housing and leakage fluid is returned to sump via exhaust 312. With the valve in the normal position shown, main line 82 is blocked by land *a* and neutral first signal line 171 is connected between lands *a* and *b* to pivot steer signal line 268. The left geared steer supply line 279' is connected between lands *b* and *c* to the left geared steer feed line 287'. The left steer feed line 246' is connected between lands *c* and *d* to the left steer supply line 278'. The right steer feed line 246 is connected between lands *e* and *f* to the right steer supply line 278. The right geared steer feed line 287 is connected between lands *f* and *g* to the right geared steer supply line 279. Three-four signal line 177 is blocked by land *g* and the three-four pivot signal line 197 is connected to exhaust 314. In the water or pivot position, the main line 82 is connected to the pivot signal line 268 between lands $a$ and $b$ and neutral first signal line is blocked by land $b$. The left geared steer supply line 279' is blocked between lands $b$ and $c$ and the left geared steer feed line 287' is connected to the left steer feed line 246' between lands $c$ and $d$. The left steer supply line 278' is connected to exhaust 315 between lands $d$ and $e$. Then similarly, the right steer supply line 278 is connected between lands $e$ and $f$ to exhaust 316. The right steer feed line 246 is connected between lands $f$ and $g$ to the right geared steer feed line 287. The right geared steer supply line is blocked by land $g$ and the 3–4 signal line 177 is connected between lands $g$ and $h$ to the 3–4 pivot signal line 197.

The steer overlap control valve 331 controls the overlap on a drive change between straight drive and steer drive and has a valve element 332 having a small land $a$ and a large land $b$ located in a stepped bore 333. A plug 336 engaging plug 337 and the latter engaging land $a$ are located in a smaller bore portion 338. The right steer feed line 246 is connected to the closed end of bore 338 and acts on the plug 336 and the left steer feed line 246' is connected to the same bore between the plugs to act on plug 337 so either steer feed line pressure applies an opening bias to valve 332 against spring 341 which biases the valve closed. The steer feed lines are pressurized alternatively with the regulated steer pressure and each pressure acts on its associated plug to provide the same pressure reducing force on the regulator valve 332. The throttle valve pressure line 212 is connected to the step between bores 338 and 333 and acts directly on the end of land $a$ and subtracts from the regulated steer pressure applied by the plugs 337 and 336 to also decrease the regulated pressure with increasing throttle pressure. The controlled exhaust line 238 is connected to the step between the lands $a$ and $b$ of valve element 332 and acts on the differential area of land $b$ to bias the valve downwardly against the biasing force of spring 341. If the controlled exhaust pressure is above the regulated value, the valve is depressed and excess fluid connected to the exhaust 342. The regulated value of the controlled exhaust pressure is decreased with increasing steer regulated pressure or T.V. pressure. The exhaust 343 vents the spring chamber. The exhaust from the drive engaging device being disengaged in line 238 is thus held at a value sufficient to maintain engagement of the drive for maximum overlap and this value is decreased with increasing torque demand or steer feed pressure to decrease overlap. When the steer feed pressure has been increased to provide a high steering torque or at maximum throttle the exhaust pressure in line 238 is reduced to zero or to a low value sufficient to keep the lines and motors filled but insufficient to move the motors against the retraction springs so there is minimum overlap.

The right and left brake control and lubrication systems 351 and 351' (FIG. 1b) are the same and the following description of the right system applies to the left system with the reference numerals primed. The right brake control shaft 352 and the left brake control shaft 352' may be manually moved simultaneously or independently by conventional means, not shown. The right brake control shaft 352 is shown in the brake disengaged position and rotates clockwise and the left brake control shaft 352' rotates counterclockwise for brake engagement. A brake control shaft 352 is also connected by suitable linkage, not shown, to rotate the lever 74 and brake cylinder 72 so that the cam mechanism 73 mechanically engages the brake independently of the hydraulic actuation. The brake signal valve 361 has a valve element 362 having lands $a$ and $b$ located in a bore 363 and is held in the exhaust position shown by the brake cam 354 fixed to shaft 352 in brake disengaged position in which the brake signal line 364 is connected to exhaust 366. When the brakes are applied and the cam 354 moves away from the valve, the spring 367 moves the valve to the connecting position connecting main line 82 to the brake signal line 364. Range main line pressure from line 131 could be used in one or both valves instead of main line 82. The air valve 371 has a stepped valve element 372 having a small land $a$ and a large land $b$ located in a stepped bore 373. The spring 374 normally biases the valve to the open position shown connecting the air vent line 376 to the air line 377 so coolant pump 381 will pump air from line 377 and thus be unloaded. When fluid pressure is supplied to the brake signal line 364 connected to the closed end of bore 373 to act on the free end of the land $a$ or when the right steer signal line 251' which is pressurized from the left steer valve during right steer is applied to the step between lands $a$ and $b$ and acts on the differential area of land $b$, the valve is closed and the air vent closed. Then pump 381 will pump fluid from sump 81 (FIG. 1b) through foot or check valve 383 and inlet line 382 to supply coolant line 386. The pump 381 has an output regulator valve. The right coolant pump 381 supplies coolant to the right coolant line 386 which has a branch 387 connected via a restriction or a valve 388 closed in the brake engaged position and opened in the brake disengaged position to cool reverse brake 57 as shown in Pat. 3,292,758 filed Feb. 24, 1964 by J. C. Polak and issued Dec. 20, 1966. There is also a restricted branch 391 connected to supply coolant to the low brake 64. Coolant line 386 is also connected to the overage relief valve 392 which is closed when there is insufficient coolant fluid to also lubricate via line 393 the vehicle brake 71. When there is sufficient fluid, the valve opens to supply, via passage 393, coolant to the vehicle brake 71.

The torque converter outlet line 401, FIG. 1, is connected at 402, FIG. 1b, to the oil cooler inlet and has a branch 403 connected to the relief valve 404 which maintains a back pressure or pressure differential to maintain flow from 402 through the cooler to the cooler outlet 406 and line 407. The regulator valve 408 maintains a proper low pressure in the cooler return line 407 and exhausts the excess to exhaust 409. The cooler return line 407 supplies fluid to the lube line 411 which is connected by a restricted right branch 412 and left branch 412' to feed lubrication and cooling fluid to the output clutches 67, 67'. The branches 413 and 413' lubricate the output gearing. The branch 414 is connected to lubricate the range gearing.

The control system employs the above valve units which individually function in the manner described in detail above in a system providing different types of driving and steering programs.

CONTROL SYSTEM OPERATION

The manual ratio selector valve 141 controls the ratio selected in the range unit 1 and the straight drive ratio in the output unit 2 to provide one group of overall ratio drives in the normal position of the steer-type selector valve 301 and another group of overall ratios in the pivot steer position of the steer-type selector valve. The lockup clutch 8 is engaged at a predetermined speed by the lockup clutch shift valve 111 and manually downshifted by detent pressure from throttle valve 201. The lockup clutch is also disengaged during each range ratio shift by the flow valve 126. The lockup clutch is also engaged by the manual selector valve 141 when in the neutral position by the signal provided by line 122 to provide a direct drive power connection to shaft 7 and shaft 7b in neutral. The right and left steer control valves 231 and 231' function to provide selected steering programs including geared steering where in one output a high drive is disengaged and a lower drive engaged so the one output is driven at a slower speed than the other output, pivot steering where in one output a drive in one direction is disestablished and a drive in the opposite direction is established so the one output is driven in an opposite direction to the other drive and drive brake steering where the drive to one output is disestablished and that output braked so the one drive is braked while the other is driven. The manual range selector valve 141 and the steer type selector valve 301 operate in conjunction with the relay valves 261, 261' to provide different groups of overall straight drive ratios and different programs of the above types of steering for vehicle steering. The normal steer program used for land operation employs geared steering in the high overall ratios and drive brake steering in lower overall ratios. The pivot steering operation used in water provides geared steer in the higher ratios and pivot steer in the lower ratios. The following tables, one when the steer type valve 301 is in normal position and a second when in pivot steer position, summarize the operation in each of the positions of the manual selector valve 141 illustrating the ratio established in the range unit and in the output unit, the overall ratios, the type of steer and the type of drive to the inner and outer tracks for steering.

steer valve 231 is moved down for steering, the drive valve 232 disconnects main line 82 from the drive feed line 234 and connects this line to the controlled exhaust line 238 to disestablish the geared steer drive and actuates the steer regulator valve 241 to supply from main line 82 a regulated steer pressure to right steer feed line 246. This line is connected at the steer type selector valve 301 to the right steer supply line 278 which is connected between the lands b and c to the right brake apply line 276 which actuates the motor 72 and brake 71 to retard the right output shaft for drive brake steering. The controlled exhaust line 238 is connected to overlap valve 331 which regulates exhaust pressure decay as described above proportional to throttle pressure and the increasing steer pressure to provide proportioning of drive release and brake apply for smooth steering operation without coasting. When the right steer valve 231 is depressed, the left regulator valve 242' is raised by means of the rod 254' to supply main line pressure to the right steer signal line 251' which is connected to right air valve 371 to close the air valve so right coolant pump 381 supplies coolant to line

| Manual selector valve position | Drive operation in normal steer | | | | Normal steer operation | | | |
|---|---|---|---|---|---|---|---|---|
| | Drive applied range unit | Gear ratio range unit | Drive applied output unit | Gear ratio output unit | Overall ratio | Type of steer | Output section drive | |
| | | | | | | | Inner track | Outer track |
| 4 | High | 1.0:1 | Output | 1.0:1 | 3.2:1 | Geared steer | Geared steer | Output. |
| 3 | Int | 2.2:1 | do | 1.0:1 | 7.2:1 | do | do | Do. |
| 2 | Low | 4.2:1 | do | 1.0:1 | 13.4:1 | do | do | Do. |
| 1 | Low | 4.2:1 | Geared steer | 1.5:1 | 19.8:1 | Drive brake | Drive brake | Geared steer. |
| N | None | | do | 1.5:1 | | do | do | Do. |
| R₁ | Int | 2.2:1 | Reverse | 2.1:1 | 15.1:1 | do | do | Reverse. |
| R₂ | High | 1.0:1 | do | 2.1:1 | 6.7:1 | do | do | Do. |

| Manual selector valve position | Drive operation in pivot steer | | | | Pivot steer operation | | | |
|---|---|---|---|---|---|---|---|---|
| | Drive applied range unit | Gear ratio range unit | Drive applied output unit | Gear ratio output unit | Overall ratio | Type of steer | Output section drive | |
| | | | | | | | Inner track | Outer track |
| 4 | High | 1.0:1 | Output | 1.0:1 | 3.2:1 | Geared steer | Geared steer | Output. |
| 3 | Int | 2.2:1 | do | 1.0:1 | 7.2:1 | do | do | Do. |
| 2 | Low | 4.2:1 | Geared steer | 1.5:1 | 19.8:1 | Pivot | Rev | Geared steer. |
| 1 | Low | 4.2:1 | do | 1.5:1 | 19.8:1 | do | Rev | Do. |
| N | None | | do | 1.5:1 | | do | Rev | Do. |
| R₁ | Int | 2.2:1 | Reverse | 2.1:1 | 15.1:1 | do | Geared steer | Rev. |
| R₂ | High | 1.0:1 | do | 2.1:1 | 6.7:1 | do | do | Rev. |

When the engine is started the input pump 86 supplies fluid to main line 82 which is regulated by main line regulator valve 88 and the overage is connected by converter feed line 96 to the lockup shift valve which in the downshift position provides an unrestricted connection via converter supply line 103'–103 to the converter operating chamber. The main line 82 is connected through restriction 129 at the lockup cut-off valve to the range line 131 which feeds the manual selector valve 141. The main line is connected to the steer valves 231–231', the steer type valve 301 and the brake signal valves 361–361' for brake cooling. The manual selector valve in neutral position exhausts all range clutch lines so the range gear unit is in positive neutral, exhausts the 3–4 signal line 167 and reverse signal line 176, supplies the neutral signal line 122 to upshift the lockup shift valve 111 to engage the lockup clutch 8 to prevent torque multiplication in the torque converter and the neutral first signal line pressure 171 which is connected through the steer type valve 301 in normal position to the pivot steer signal line 268 to chambers 269–269' to move plugs 271–271' to hold the relay valves 261–261' in the mid position. The steer valves 231–231' in straight drive position connect main line 82 respectively to drive feed lines 234–234' and branches 288–288' which are connected by the relay valves 261–261' in the mid position between lands d and e to the right geared steer apply lines 286–286' which are directly connected to actuate the motors 66–66' to apply geared steer brakes 64–64' and establish the geared steer drive the lower ratio drive in the output unit. When, for example, the right 386 and the engaging brake 71. The converter outlet as pointed out above is connected to provide supplemental cooling fluid to cool the vehicle brakes. Thus in neutral drive position of the manual selector valve 141, and normal position of the steer type valve 301, the output unit has both geared steer clutches engaged for straight drive and upon operation of the steering valves, this drive to one output is disengaged and the brake for that output is applied for steering when in neutral and coasting or to condition the drive for steering on a shift to first drive.

With the manual valve 141 in neutral, when the steer type selector valve 301 is moved from the normal to the pivot steer position, the neutral first signal line 171 is blocked but the main line 82 is connected to the pivot steer signal line 268 to maintain the relay valves in the mid position.

With the steer valves 231–231' in straight drive position, the drive valves 232–232' connect main line 82 to the right and left drive feed lines 234–234' which are connected via branches 288–288' with the relay valve in mid position to the geared steer lines 286–286' respectively to motors 66–66' to apply reaction brakes 64–64' to establish geared steer or low drive in the output unit to both outputs. On right steering, the valve element 232 is depressed to connected feed line 234 to the controlled exhaust line 238 to disestablish geared steer drive and the steer regulator valve 241 is actuated to provide regulated steer pressure to the right steer feed line 246 which is connected at the steer type selector valve 301 to the right geared steer feed line 287 which is connected by the relay valve 261 to the reverse apply line 281 to apply the reverse reaction brake 57 for pivot steering. The overlap valve controls decay of the geared steer drive pressure in relation to throttle pressure and increasing reverse brake pressure for a smooth pivot steering shift without interruption of drive and control of the vehicle.

Thus pivot steering is provided for coasting or to condition the transmission for immediate steering on a shift to first drive.

When the manual selector valve 141 is shifted to first position, range main line 131 is connected to low ratio line 174 to establish low ratio and connect all other range ratio lines to exhaust so that the range section is in low drive. The neutral signal line 122 is exhausted in first and all other drive positions of the manual valve 141 to return the lockup clutch to control by the lockup shift valve 111 and the lockup cut-off valve 126. The reverse signal line 176 is exhausted in neutral and all forward drive positions of the manual selector valve. The manual valve 114, in first, as in neutral, connects range main pressure to the neutral first signal line 171 which is connected by the steer type selector valve 301 in the normal position to the pivot steer signal line 268 which pressurizes chambers 269–269' to move plugs 271–271' up to position the relay valves 261–261' in the mid position.

As described above in neutral steer valves 231–231' connect main line 82 to drive feed lines 234–234', and via relay valves 261–261' to motors 66–66' to apply geared steer or low brakes 64–64' for low ratio drive in the output unit which with low in the range unit provides the first or low low ratio straight forward drive. As in neutral when one steering valve 231 is depressed the low brake motor is exhausted by right drive feed line 234 to exhaust 238 by steer valve 232 and steer regulator valve provides a regulated pressure via right steer feed 246, steer type valve 301 in normal position, right steer supply line 278, relay valve 261, right brake apply line 276 to motor 74 to apply brake 71 for drive brake steering as in neutral.

If the steer type valve 301 is shifted to pivot position the relay valve remains in mid position and as in neutral and first normal type steer provides geared steer or low drive in the output unit and with low in the range unit the same overall ratio as first normal type steer for straight drive. During pivot steering as in normal steer the geared steer output drive is disestablished and regulated pressure is supplied to the right steer feed line 246 but the steer type valve 301 connects it to the right geared steer feed 287 to and via relay valve 261 to reverse brake line 281 to apply reverse brake 57 for reverse drive in the right output unit which with forward in the left unit provides pivot steer.

In second drive position, the manual valve 141 connects range main line 131 to low ratio line 174 to low motor 19 for low range unit drive as in first. The high clutch line 172, intermediate brake line 173, neutral signal line 122, neutral first signal line 172 and 3–4 signal line 177 are exhausted. For normal type steer operation relay valves 261–261' are biased by springs 264–264' to the down position since there is no upward acting pressure as the pivot steer signal line 268 is connected through the steer type selector valve 301 in the normal steer position to the neutral first signal line 171 which is exhausted at the manual valve 141.

In second normal type steer with the relay valves 261–261' in the down position and the steer valves 231–231' in straight drive position shown, main line 82 is connected by the steer valves to right and left drive feed lines 234–234' and by the relay valves to the right and left high output clutch lines 289–289' to motors 68–68' to apply high clutches 67–67' for high ratio in the output unit, which with low in the range unit provides second ratio with normal steering. When the right steer valve 231 is depressed for right steer drive feed line 234 is exhausted and regulated pressure supplied to right steer feed line 246 which is connected by the steer type valve 301 in normal position via the right steer supply line 278, the relay valve 261, the right geared steer supply line 279, the pivot type steer valve 301 to the right geared steer feed line 287, the relay valve 261 and the right geared steer line or low line 286 to motor 66 to apply low brake 64 for geared steer. The overlap valve 331 controls decay of high clutch pressure in relation to throttle pressure and the increasing geared steer or low drive pressure to provide a smooth steering shift transfer without interruption of drive and assuring continuous vehicle control.

In second, when the steer selector type valve 301 is moved to the pivot position, the pivot steer signal line 268 is disconnected from the exhausted neutral first signal line 171 and connected to the main line 82 to supply main line pressure to the chamber 269 to move plug 271 upward to posiotion the relay valve 262 in the mid position. Then as in neutral and first, the steer valves 231–231' in the straight drive position connect main line 82 via drive feed lines 234–234' and branches 289–289' respectively between the lands e and f of the relay valve elements 262–262' to the geared steer or low apply lines 286–286' which are directly connected to engage the low brakes 64–64' to provide low ratio drive in the right and left output units. When the right steer valve 231 is depressed for right steer, the main line is disconnected from the drive feed line 274 and this feed line connected to controlled exhaust line 238 to disengage the low or geared steer brake 64 in the right output section. At the same time, the steer regulator valve element 241 is actuated to supply regulated steer pressure to the right steer feed line 246. The steer feed line 246 is connected at the steer type selector valve 301 in pivot position to the right geared steer feed line 287 which is connected between the lands d and e of relay valve element 262 to the reverse apply line 281. This line is directly connected to the reverse motor 58 to establish the reverse clutch 57 for reverse drive in the right output unit. Thus, in second position pivot type steer operation, we have a lower straight drive ratio than in normal type steer operation, the same ratio as in first position normal type steer operation and straight drive is through the geared steer or low ratio drive in the output units and for steering this drive to one unit is disestablished and the reverse drive is established.

In third and fourth positions, the manual valve 141 respectively connects range main line 131 to the intermediate clutch line 173 to engage intermediate brake 29 and to the high line 172 to engage high clutch 36 to respectively establish these ratios in the range unit.

The intermediate and low range ratio apply lines 173–174, the neutral signal line 122, neutral first signal line 171 and reverse signal line 176 are exhausted. Main line 82 is connected to the 3–4 signal line 177 in both third and fourth manual valve positions and will act in chambers 266–266' to position and hold the relay valves 261–261' down in the position shown for high ratio straight drive in the output section and geared steer operation. In the normal position of the steer type valve 301 pivot signal line 268 is exhausted via neutral first signal line 171 at the manual valve 141 so there is no upward bias on the relay valves. In the pivot steer position of the steer type valve 301, though main line 82 is connected to the pivot steer signal line 268 to act on plugs 271–271' the force is insufficient to overcome respectively the springs 264–264' and 3–4 signal pressure acting on the top of valve elements 262–262' so the relay valves are positioned in the down position shown for third and fourth drives.

Thus, in third and fourth drives, the output section, drive and steering controls function as above described for second drive normal type steer operation. The third intermediate is combined with high in the output unit for third straight drive in both types of steer type operation.

In fourth drive high in the range unit is combined with high in the output unit for straight fourth drive in both types of steer operation. In both third and fourth drives and both types of steer control the high drive in one output unit is disestablished and the geared steer or low drive in the same output unit is established.

In $R_1$ and $R_2$ positions of the manual valve, the range line 131 is respectively connected to the intermediate line 173 to engage the intermediate brake 29 and to the high line 172 to engage the high clutch 36 to establish intermediate and high ratios in the range unit. The manual valve also supplies the reverse signal line 176 and exhausts all other lines. The reverse signal line is connected to the chambers 267–267' below land g of relay valve elements 262–262' to position the relay valve in the up position. With the steer valves 231–231' in straight drive position, main line 82 is connected by valve elements 232–232' to the drive feed lines 234–234' which are connected between the lands d and e to the reverse clutch apply lines 281–281' to actuate the reverse motors 58–58' and reverse brakes 57–57' to establish reverse ratio in the right and left output units. For right steering, drive feed line 246 is exhausted by the drive valve 232 to controlled exhaust line 238 as in other steering operations, to disengage the right reverse drive. The steer regulator valve 241 supplies regulated pressure to the right steer feed line 246 which is connected at the steer selector valve to the right steer supply line 278. This is connected between lands b and c of the relay valve element 262 to the brake apply line 276 to engage output brake 71 to provide drive brake steering.

When the steer type selector valve 301 is moved to the pivot position, though main line 82 is connected to the pivot steer signal line 268, steer relay valves remain in the up position due to the reverse signal pressure in line 176. For straight forward drive the steer valves establish reverse in the output unit as in reverse drive normal type steer operation. For steering downward movement of the drive valve 232 disengages the reverse drive as above and actuates the steer regulator vale 241 to supply steer pressure to the right steer feed line 246 which is connected at the steer type selector valve 301 in the pivot position to the right geared steer feed line 287 which is connected at relay valve 262 between lands e and f to the geared steer apply line 286 to establish the forward drive geared steer which combination with reverse provides reverse pivot steer.

| Ratio | Normal steer | | Pivot steer | |
|---|---|---|---|---|
| | Relay valve position | Type steer | Relay valve position | Type steer |
| 4 | Dn | GS | Dn | GS |
| 3 | Dn | GS | Dn | GS |
| 2 | Dn | GS | Mid | P |
| 1 | Mid | DB | Mid | P |
| N | Mid | DB | Mid | P |
| R₁ | Up | DB | Up | P |
| R₂ | Up | DB | Up | P |

The above chart summarizes the positions of the relay valves 261–261' and the type of steer in each drive for each type of steer. Up, Mid (middle or center) and Dn (down) are only used for convenient reference because the valve is illustrated in the vertical position. It is understood that this and other valves could be placed in any position. The steer types are GS (geared steer), DB (drive brake steer) and P (pivot steer). From this chart it will be seen that the relay valves provide geared steer in the down position when the steer type valve 301 is in the normal or pivot position since in both cases the steer line 246 is connected to the geared steer feed line 287 and geared steer or low apply line 286. In the mid position the relay valves in the mid position with the steer type valve in normal position provide drive brake, steering since steer line 246 via steer supply line 278 is connected to brake apply line 276 and with the steer type valve in pivot position provides pivot steer since steer line 246 via geared steer line 287 is connected to reverse apply line 281.

In reverse the relay valves are up for drive brake steer with the steer type valve 301 in normal position since stear line 246 is connected by steer supply line 278 to brake apply line 276 and for pivot steer with the steer type valve in pivot position as steer line 246 via geared steer line 287 is connected to geared steer apply line 286.

It will be appreciated that this transmission may be modified.

What is claimed is:

1. In a transmission, a multiratio transmission unit having a plurality of drive establishing means selectively operable to establish a plurality of torque ratios; an output gear drive unit having an input element driven by said transmission unit and a pair of multiple torque ratio output gear drive establishing means each driven by said input element and having a driven output element and selectively operable to provide a plurality of output drive torque ratios operable in combination with selected transmission unit torque ratios to provide a plurality of overall ratio drives; a brake for retarding each of said output elements; ratio control means having a plurality of control positions operatively connected to said plurality of transmission unit torque ratio establishing means to establish selected ratios in said positions, steer type selector means having a plurality of positions, and steer control means operatively connected to said output drive ratio establishing means and said brakes for selectively establishing steering drives by disestablishing the drive and applying said brake for drive brake type steering, by disestablishing one drive and establishing a lower ratio drive for geared type steering and by disestablishing one drive and establishing an opposite direction drive for pivot type steering and controlled by said ratio control means and said steer type selector means to provide in one position of said steer type selector means a group of overall ratio drives and at least one type of steering and operative in another position of said steer type selector means to establish a group of overall ratio drives and at least one type of steering not provided in said one position.

2. The invention defined in claim 1 and said steer type selector means providing in said one position two of said types of steering and in said another position substituting a third type steering for at least some of said two of said types of steering.

3. The invention defined in claim 1 and said steer type selector means in said one position providing only geared steering in at least some ratios and in said another position providing only pivot steering in at least said some ratios.

4. The invention defined in claim 1 and said steer type selector means providing in said one position geared type steering and drive brake steering and in said another position geared type steering and pivot type steering.

5. The invention defined in claim 1 and said steer type selector means in said one position providing one group of overall ratio drives and in said another position providing a different group of overall ratio drives.

6. The invention defined in claim 2 and said steer type selector means in said one position providing one group of overall ratio drives and in said another position providing a different group of overall ratio drives.

7. In a transmission, a multiratio transmission unit having a plurality of drive establishing means selectively operable to establish a plurality of torque ratios; an output gear drive unit having an input element driven by said transmission unit and a pair of multiple torque ratio output gear drive establishing means each driven by said input element and having a driven output element and selectively operable to provide a plurality of output drive torque ratios selectively operable in combination with selected transmission unit torque ratios to provide a plurality of overall ratio drives; a vehicle brake for retarding each of said output elements; ratio control means having a plurality of control positions operatively connected to said plurality of transmission unit torque ratio establishing means to establish selected ratios in said positions, steer type selector means having a plurality of positions, and steer control means operatively connected to said output drive ratio establishing means and said brakes for selectively establishing steering drives by disestablishing the drive and applying said brake for drive brake type steering, by disestablishing one drive and establishing a lower ratio drive for geared type steering and by disestablishing one drive and establishing an opposite direction drive for pivot type steering and controlled by said ratio control means and said steer type selector means to provide in one position of said steer type selector means one group of overall ratio drives and drive brake type steering in one subgroup and geared type steering in the remaining overall ratios and operative in another position of said steer type selector means to establish another different group of overall ratios and pivot type steering in a subgroup and geared type steering in the remaining overall ratio.

8. In a transmission; variable torque multiplication drive means having input drive means, a pair of variable torque multiplication output drive means each jointly selectively operable for providing high and low torque multiplication drives driven by said input drive means and each having a driven output element; straight drive control means operably connected to said output drive means for providing a plurality of equal torque multiplication drives in said output drive means to drive each output element at the same speed for straight drive; steer control means operably connected to said output drive means for selectively providing a first steering drive having a differential speed between said output elements for turning and a second steering drive having a larger differential speed between said output elements for sharper turning and said straight drive control means including means responsive to the sharper turning for limiting reduction of torque multiplication ratio at lower speeds when the transmission is conditioned for said second steering drive than when conditioned for said first steering drive.

9. In a transmission; multiratio gearing means having input drive means, a pair of multiple torque ratio output gear drive establishing means each selectively operable for providing two forward gear drives and a reverse gear drive driven by said input drive means and each having a driven output element; straight drive control means operably connected to said multiratio gearing means for providing a plurality of ratio drives in which each driven output element is driven at the same speed; steer control means operably connected to said multiratio gearing means for selectively providing a first steering drive having a differential speed between said driven output elements for turning and a second steering drive having a larger differential speed between said driven output elements for sharper turning and said straight drive control means including inhibitor means operably connected to said steer control means for preventing a downshift of said multiratio gearing means by said straight drive control means above a predetermined speed when said steer control means provides said first steering drive and for preventing a downshift of said multiratio gearing means by said straight drive control means above a lower predetermined speed when said steer control means provides said second steering drive.

10. The invention defined in claim 9 and said straight drive control means providing a plurality of forward drive ratios and a reverse drive ratio; and said steer control means including a brake on each driven output element and providing a first drive brake steering by disestablishing the drive ratio and engaging the brake of one driven output element and a second pivot steering by disestablishing one drive ratio and establishing another drive ratio driving one driven output element in the opposite direction.

11. The invention defined in claim 9 and said steer control means including steer type preselector means for preselecting said first steering drive and said second steering drive and said inhibitor means being responsive to said steer type preselector means.

12. In a transmission, multiratio gearing means having input drive means, a pair of multiple torque ratio output gear drive establishing means each selectively operable for providing two forward gear drives and a reverse gear drive driven by said input drive means and each having a driven output element; straight drive control means operably connected to said multiratio gearing means for providing a plurality of forward drives and a reverse drive in which each driven output element is driven at the same speed; steer control means including a brake for retarding each driven output element and operably connected to said multiratio gearing means for selectively providing geared steering drive by disestablishing one drive and establishing a lower ratio drive to one driven output element, drive brake steering by disestablishing one drive and applying said brake and pivot steering by disestablishing one drive and establishing a drive in the opposite direction and said straight drive control means including inhibitor means operably connected to said steer control means for preventing a downshift of said multiratio gearing means by said straight drive control means above a predetermined normal speed and for preventing a downshift of said multiratio gearing means by said straight drive control means above a lower predetermined speed when said steer control means provides said pivot steering drive.

13. The invention defined in claim 12 and said steer control means including steer type control means providing for selection of drive brake steering or pivot steering in a ratio drive.

14. The invention defined in claim 12 and said steer control means including steer type control means providing for selection of geared steering or pivot steering in a ratio drive.

15. The invention defined in claim 12 and said steer control means including steer type control means providing for selection of a first program having geared steering in the higher drive ratios and drive brake steering in the lower ratios and a second program having geared steering in the higher ratios and pivot steering in the lower ratios.

16. The invention defined in claim 15 and said lower ratios in said second program being a larger group of ratios than said lower ratios in said first program.

17. In a transmission; multiratio gearing means having input drive means, a pair of multiple torque ratio output gear drive establishing means each selectively operable for providing two forward gear drives driven by said input drive means and each having a driven output element; straight drive control means operably connected to said multiratio gearing means for providing a plurality of ratio drives in which each driven output element is driven at the same speed; steer control means operably connected to said multiratio gearing means for selectively providing in the same ratio drive a first steering drive having a geared differential speed between said driven output elements for turning and a second steering drive having a larger geared differential speed between said driven output elements for sharper turning.

18. The invention defined in claim 17 and said straight drive control means including inhibitor means operably connected to said steer control means for preventing a downshift of said multiratio gearing means by said straight drive control means above a predetermined speed when said steer control means provides said first geared steering drive and for preventing a downshift of said multiratio gearing means by said straight drive control means above a lower predetermined speed when said steer control means provides said second geared steering drive.

19. The invention defined in claim 17 and said first geared steering drive driving both driven output elements in the same direction at a lower differential speed and said second geared steering drive driving said driven output elements in opposite directions.

20. In a transmission; multiratio gearing means having input drive means, a pair of multiple torque ratio output gear drive establishing means each selectively operable for providing two forward gear drives and a reverse gear drive driven by said input drive means and each having a driven output element; straight drive control means operably connected to said multiratio gearing means for providing a plurality of ratio drives and a reverse drive in which each driven output element is driven at the same speed; steering control means operably connected to said multiratio gearing means for selectively providing a first steering drive having a low differential speed between said driven output elements for turning and a second steering drive having a larger differential speed between said driven output elements for sharper turning and a third steering drive having the largest differential speed between said driven output elements for the sharpest turning.

21. The invention defined in claim 20 and said straight drive control means including inhibitor means operably connected to said steering control means for preventing a downshift of said multiratio gearing means by said straight drive control means above a predetermined speed when said steering control means provides one steering drive and for preventing a downshift of said multiratio gearing means by said straight drive control means above a lower predetermined speed when said steering control means provides another steering drive providing a sharper turn.

22. The invention defined in claim 20 and said steering control means including steer type control means selectively providing a first program having said first and second steering drives and a second program having said first and third steering drives.

23. The invention defined in claim 20 and said steering control means including steer type control means selectively providing a first program having said first and second steering drives and a second program in which some of said first and second steering drives are replaced by said third steering drive.

24. The invention defined in claim 20 and said steering control means including a brake on each output element and providing in said first steering drive geared steering established by disestablishing the drive to one driven output element and establishing a lower ratio drive to that one driven output element, said second steering drive is drive brake steering established by disestablishing the drive to one driven output element and applying the brake on that one driven output element and said third steering drive is pivot steering established by disestablishing the drive to one driven output element and establishing a drive in the opposite direction to that output element.

25. In a transmission; a multiratio transmission gear means having a plurality of fluid operated ratio drive establishing means selectively operable to establish a plurality of ratio drives; output drive means having input means driven by said transmission means, right and a left output gear means each driven by said input means, each having fluid operated means selectively operable for establishing a low and a high gear ratio forward drive and a reverse ratio drive, each having an output element, each having a brake operably connected to the output element for providing low and high ratio straight forward drive by selective establishment of both right and left low and high ratio drives, and selectively for right and left steer to control the operation of one of the right and left output gear means for the geared steer mode by disestablishing high ratio and establishing low, in the drive brake mode by disengaging the drive and engaging the brake and in the pivot steer mode by disestablishing the drive and establishing a reverse drive; a source of fluid under pressure; steer valve means connected to said source for providing in straight drive position a right and left drive pressure and selectively movable to one of a right and left steer position to respectively exhaust right and left drive pressure and provide right and left steer pressure; ratio control means having a plurality of ratio control positions connecting said source selectively to said ratio establishing means of said transmission to establish each ratio drive in said transmission gear means and providing a low ratio signal pressure; and control means including relay valve means normally biased to a geared steer position and having fluid actuator means responsive to pressure for positioning said relay valve means in a drive brake steer position operative to connect said drive pressure to both output gear means for high ratio drive in geared steer position and for low ratio drive in drive brake steer position for straight forward drive in combination with said ratio drives of said transmission gear means and having drive brake and pivot steer ports both connected to said output drive means for geared steer in said geared steer position and in said drive brake steer position said drive brake port being connected to said output gear means for drive brake steer and said pivot steer port being connected to said output gear means for pivot steer; and steer type control means having a normal position connecting said steer pressure to said relay valve means for geared steer and said low ratio signal to said actuator means to position said relay valve means in drive brake steer position for drive brake steering in low ratio and a pivot steer position providing a pivot steer signal to said actuator to position said relay valve means in drive brake position and connect said steer pressure to said pivot port for pivot steering.

26. The invention defined in claim 25 and said ratio control means providing a high ratio signal connected to said actuator means to hold said actuator means in geared steer position against said pivot steer signal to provide in said high ratio geared steer in both positions of said steer type selector valve.

27. The invention defined in claim 26 and said ratio control means providing in reverse position a low drive in said transmission gear means and a reverse signal connected to said actuator and said relay valve means in response to said reverse signal being positioned in a reverse position connecting said drive pressure to establish reverse in each output gear means and said steer pressure from said drive brake port for drive brake steer and from said pivot port for pivot steer.

28. In a transmission; variable torque multiplication drive means having input drive means, a pair of variable torque multiplication output gear drive means each jointly and selectively operable for providing high and low torque multiplication in forward gear drives and a reverse gear drive driven by said input drive means and each having a driven output element; straight drive control means operably connected to said variable torque multiplication drive means for providing a plurality of forward ratio drives and a reverse ratio drive in which each driven output element is driven at the same speed; steer control means connected to said variable torque multiplication drive means for selectively providing a first steering drive having a low differential speed between said driven output elements for turning, a second steering drive having a larger differential speed between said driven output elements for sharper turning and a third steering drive reversely driving said driven output elements for sharpest turning.

References Cited
UNITED STATES PATENTS

| | | | |
|---|---|---|---|
| 2,912,884 | 11/1959 | Christenson et al. | 74—720.5X |
| 2,930,257 | 3/1960 | Christenson | 74—720.5 |
| 2,950,633 | 8/1960 | Goodrich | 74—720.5 |
| 3,039,327 | 6/1962 | Breting | 74—720.5 |
| 3,137,182 | 6/1964 | Berchtold | 74—720.5 |
| 3,174,362 | 3/1965 | Fisher et al. | 74—720.5 |
| 3,303,723 | 2/1967 | Ruf | 74—720.5X |
| 3,378,119 | 4/1968 | Schaefer | 74—720.5X |
| 3,403,583 | 10/1968 | Maci et al. | 74—720.5 |
| 3,439,559 | 4/1969 | Binger et al. | 74—720.5 |

ARTHUR T. McKEON, Primary Examiner

PO-1050
(5/69)

UNITED STATES PATENT OFFICE
CERTIFICATE OF CORRECTION

Patent No. 3,572,166          Dated March 23, 1971

Inventor(s) Sidney A. Rains

It is certified that error appears in the above-identified patent and that said Letters Patent are hereby corrected as shown below:

In the specification, column 2, line 71, "tongue" should be -- torque --; column 7, line 70, the word -- valve -- has b omitted and should be inserted between "relay" and "element column 14, line 18 "posiotion" should be -- position --; column 16, line 13, the word "stear" should be -- steer --.

Signed and sealed this 24th day of August 1971.

(SEAL)
Attest:

EDWARD M. FLETCHER, JR.          WILLIAM E. SCHUYLER, JR.
Attesting Officer          Commissioner of Patents